United States Patent Office 3,488,282
Patented Jan. 6, 1970

3,488,282
CYCLIC ADDUCT-TYPE HYDROCARBON SEPARATION USING VARIABLE TEMPERATURE
Norris W. Mitchell and Donald M. Little, Bartlesville, Okla., assignors to Phillips Petroleum Company, a corporation of Delaware
Filed Mar. 27, 1968, Ser. No. 716,425
Int. Cl. C10g *43/02, 29/20*
U.S. Cl. 208—308                                     8 Claims

ABSTRACT OF THE DISCLOSURE

An amide capable of selectively forming a crystalline hydrocarbon adduct, a sulfolane compound, and a mixed hydrocarbon feed are added to a reaction vessel and mixed to form the adduct at a relatively low temperature. After the reaction is completed, any agitation utilized to effect mixing is ceased and the reactants stratify into an upper unreacted hydrocarbon phase and a lower sulfolane phase containing the adduct crystals. The unreacted hydrocarbon phase is withdrawn as a first product. The remaining sulfolane phase containing adduct crystals is then heated to a temperature short of that required to decompose the adduct, at which temperature occluded nonreactive hydrocarbon within the sulfolane phase is "sprung" from this phase to form a wash liquid which becomes a separate phase and is withdrawn. The remaining sulfolane phase is then heated further to a temperature sufficient to decompose the adduct. The mixture is then recooled to a temperature low enough to reform the adduct, but not as low as the temperature at which the initial adduct was formed. The above process is repeated at least once except that the temperature to which the remaining sulfolane phase is heated to "spring" the unreacted hydrocarbon is higher in each successive cycle, and the temperature to which the mixture is cooled to reform the adduct is also higher in each successive cycle. After the final cycle, the mixture formed on decomposing the adduct is allowed to stratify into a lower sulfolane phase and an upper reactive hydrocarbon phase. This reactive hydrocarbon phase is then withdrawn as a second product of the process.

Background of the invention

This invention relates to a method of separating hydrocarbons by the cyclic formation and subsequent decomposition of amide-hydrocarbon adducts at progressively higher temperatures in the presence of a sulfolane compound.

According to the prior art, the adduct crystals are generally physically separated from the reaction mixture, for instance by filtration or centrifuging, or else they are contained within a thixotropic mixture from which the nonreactive phase is separated by agitation. These separated crystals are then heated to decompose the adduct and release the hydrocarbon. French Patent 969,979, for instance, discloses forming such complexes which are separated from the liquid materials by filtering, and Kerns, U.S. Patent 2,911,350, Nov. 30, 1959, discloses either filtering or centrifuging to separate the adduct crystals from the nonreactive components in any diluent which may be present. Keller, U.S. Patent 2,914,455, Nov. 24, 1959, discloses a method for eliminating solids separation in an adduct-type hydrocarbon separation, but Keller requires the use of particular solvent systems which form a thixotropic mixture and, therefore, elaborate agitation means are required to effect separation of the nonreactive hydrocarbon from the thixotropic phase containing the adduct crystals. Water has been used in the prior art (e.g., U.S. 2,938,022) to dissolve amides such as urea before their addition into a reaction vessel. However, water has an undesirable tendency to form emulsions with hydrocarbons, particularly those boiling above about the boiling point of gasoline, i.e., hydrocarbons having about ten or more carbon atoms in their molecules.

Thus, while this hydrocarbon adduct process for the separation of hydrocarbons has been known for many years, it has never achieved commercial success except, perhaps, in the separation of certain waxes, at least partly because of the complexity of separating the adduct from the reaction mixture.

In a copending application there is disclosed a method for effecting adduct-type hydrocarbon separation without the need for the separation of liquid either physically from solids, for instance by filtering, or from a thixotropic mixture; this is accomplished by performing the adduction and subsequent decomposition of the adduct in the presence of a sulfolane compound.

Summary of the invention

It is an object of this invention to achieve an ultrapure hydrocarbon product by means of an adduct-type hydrocarbon separation. A still further object of this invention is to separate straight chain hydrocarbons from a mixture comprising straight chain and branched chain hydrocarbons, so as to give a high yield of the straight chain material having a high purity. It is yet a further object of this invention to separate normal paraffins from mixed feed using a urea adduction process to give an ultrapure normal paraffin product in exceptionally high yield.

In accordance with this invention, a mixture of hydrocarbons is separated by forming an adduct of a reactive hydrocarbon in a reaction vessel in the presence of a sulfolane compound recovering the unreacted hydrocarbon by phase separation, heating the remaining sulfolane phase containing the adduct crystals to an intermediate temperature below that at which the adduct is decomposed so as to release from the sulfolane phase occluded hydrocarbons which are thereafter removed, further heating the remaining sulfolane phase to decompose the adduct, thereafter repeating the process at least once utilizing a progressively higher temperature for the adduct formation and withdrawal of the released hydrocarbons for each successive cycle, at the end of the final cycle allowing the reactive hydrocarbon and sulfolane to separate into separate phases, and withdrawing the reactive hydrocarbon phase.

Brief description of the drawings

In the drawings, forming a part hereof.

Description of the preferred embodiments

Figure 1:
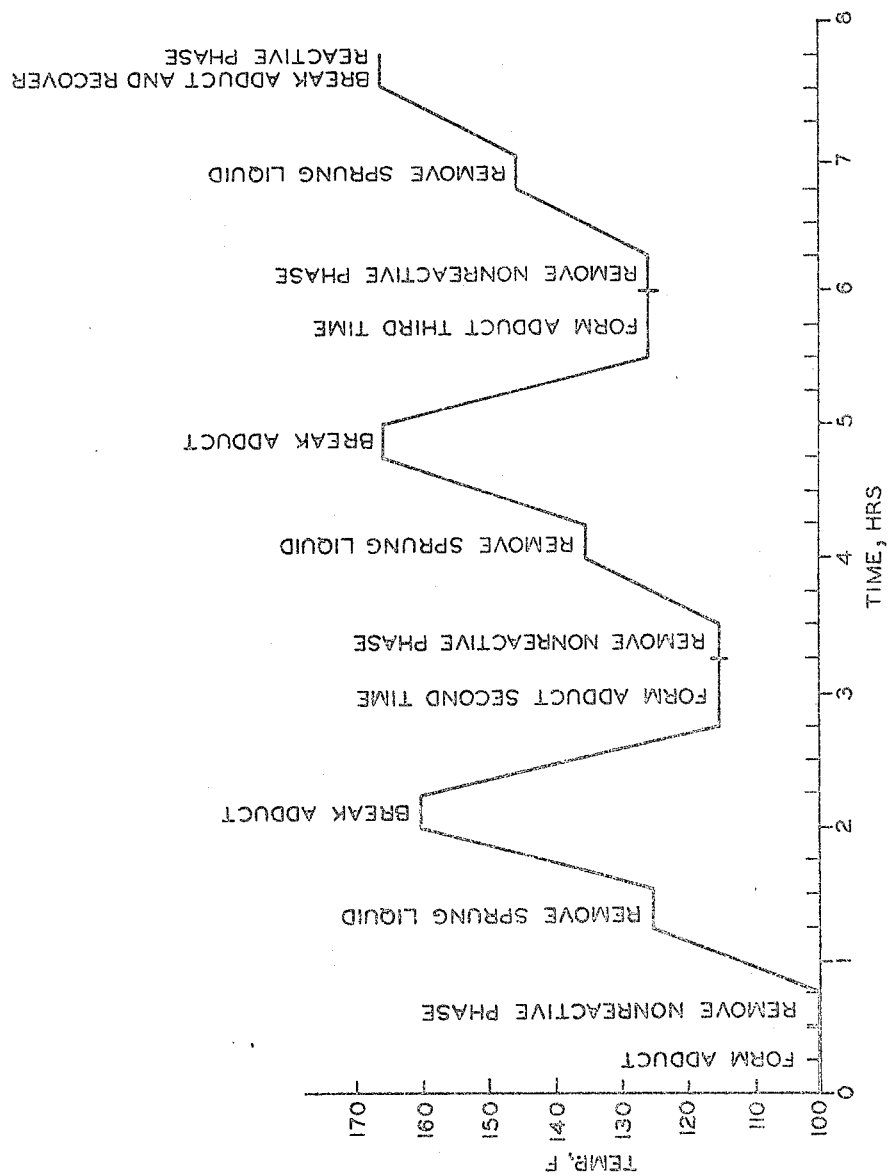
FIGURE 1 is a graph showing the relationship of the time and temperature at the various stages in the process.

Referring to FIGURE 1, there is shown a graph relating the time and temperature for the various steps in the process of the instant invention. In this figure the cyclic process is shown as being repeated two times (for a total of three cycles) although it can be repeated any number of times. Generally, between two and six cycles will be utilized. The formation of the adduct and the removal of the "sprung" or released wash liquid occurs at progressively higher temperatures in each cycle. The breaking of the adduct may take place at the same temperature in all cycles or at a different temperature in the various cycles. Generally, the initial formation of the adduct will take place at a temperature within the range of about 80 to about 110° F.; and the initial removal of "sprung" wash liquid will generally take place at a temperature within the range of 120 to 130° F. The subsequent formation of the adduct will take place at a temperature within the range of about 105 to 130° F.; and the subsequent removal of "sprung" wash liquid will take place at a temperature within the range of 130 to 155° F. For a three cycle process the initial temperatures are as noted above; the temperature for the second formation of the adduct will be within the range of about 105 to 120° F.; and for the third formation of the adduct the temperature will generally be within the range of 120 to 130° F.; the temperature for the second removal of "sprung" wash liquid will generally be within the range of 130 to 140° F.; and for the third removal of "sprung" wash liquid the temperature will generally be within the range of 140 to 155° F. The temperature for breaking the adduct will be in the range of about 160 to 185° F. in all cases. To some extent these temperatures will vary slightly depending on the particular adduct being formed. During the formation of the adduct the mixture is agitated vigorously. After the adduct is formed, the agitation is ceased so as to allow the materials to separate into separate phases. The upper nonreactive hydrocarbon phase is then removed by simple phase separation. The remaining sulfolane phase is heated to an intermediate temperature short of that at which the adduct would break. The temperature is then maintained at this intermediate level for a short period of time. During the heating to this intermediate temperature, nonreactive material which was occluded within the sulfolane phase is released or "sprung" and rises to form an upper phase (no agitation is used during this step). This action of releasing occluded material serves as a wash liquid for the adduct crystals. A very small amount of adduct crystals may decompose during this step and the resulting released reactive hydrocarbon will also form in the upper hydrocarbon phase. This wash liquid is then removed by phase separation and the remaining sulfolane phase is heated to a temperature sufficient to break the adduct. Instead of achieving a phase separation of the released hydrocarbon phase and the sulfolane phase containing the dissolved amide, the resulting mixture is agitated and cooled so as to reform the adduct crystals a second time. As stated above, the temperature at which the adduct crystals are formed the second time is slightly higher than the temperature at which the adduct was formed the first time. A small amount of nonreactive hydrocarbon which was occluded within the sulfolane phase during the first cycle forms a nonreactive phase above the sulfolane phase after the formation of this second adduct and is withdrawn by simple phase separation. The remaining sulfolane phase containing the adduct crystals is then heated a second time to an intermediate temperature to spring a very small amount of nonreactive hydrocarbon which is still occluded within the sulfolane phase, and the resulting hydrocarbon phase removed by phase separation, this step being carried out at a slightly higher temperature than the corresponding step in the initial cycle. The remaining sulfolane essentially free of occluded nonreactive hydrocarbon and containing especially pure adduct crystals is then heated to a temperature sufficient to decompose the adduct. At this point the mixture can be allowed to stratify and the ultrapure released reactive hydrocarbon separated from the sulfolane containing the released amide by phase separation, or additional cycles can be formed to further purify the product.

This process allows for the recovery of a reactive hydrocarbon product of exceptionally high purity without unduly sacrificing the yield of the reactive component.

This process is particularly suited for separating $C_{10}$ and higher normal paraffins, for instance $C_{10}$ to $C_{13}$ normal paraffins, from a mixed stream. The very small amount of reactive hydrocarbon "sprung" during the intermediate heating step is predominantly $C_9$ and lower material which forms a less stable adduct. Thus, with regard to the desired product, the $C_{10}$ to $C_{13}$, the yield is almost 100 percent, in addition to being of ultra high purity.

The reactor pressure can vary widely depending upon the type of hydrocarbon being separated and is sufficient to maintain the hydrocarbon in the liquid phase. Generally, a pressure in the range of 1 to 500 p.s.i.g, preferably 5 to 10 p.s.i.g., is used during the formation of the adduct. During the formation of the adduct the reaction mixture is generally agitated in order to provide the production of preferred small crystals of adduct and also to provide intimate contact of the various reactants.

After the formation of the adduct, the agitation is terminated in order to allow the reactants to stratify.

Generally, a pressure between 1 and 20 p.s.i.g., preferably 5 to 10 p.s.i.g., is utilized during the decomposition of the adduct. The pressure is sufficient to maintain the hydrocarbon as a liquid.

The term "sulfolane compound" refers to a compound of the following structural formula:

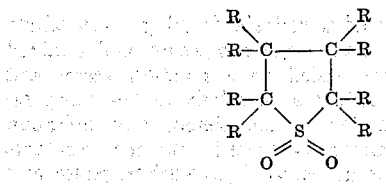

Each R can represent either a hydrogen atom or a hydrocarbon radical having from 1 to 6 carbon atoms per molecule. The preferred material is sulfolane, i.e., a sulfolane compound where each R in the above formula represents a hydrogen atom. Examples of substituted sulfolanes include 2-methyl sulfolane, 3-methyl sulfolane, 3-ethyl sulfolane, 2,4-dimethyl sulfolane, 2-butyl sulfolane, 2-isobutyl sulfolane, 2-butenyl sulfolane, 2-cyclopentyl sulfolane, and the like.

The hydrocarbon feed can contain normal and branched chain paraffins, normal and branched chain olefins, naphthenics (cycloparaffins), such a cyclohexane, and aromatics. These hydrocarbons can have from 6 to 50 carbon atoms per molecule, preferably from 7 to 24, more preferably 10 to 24.

Figure 2:
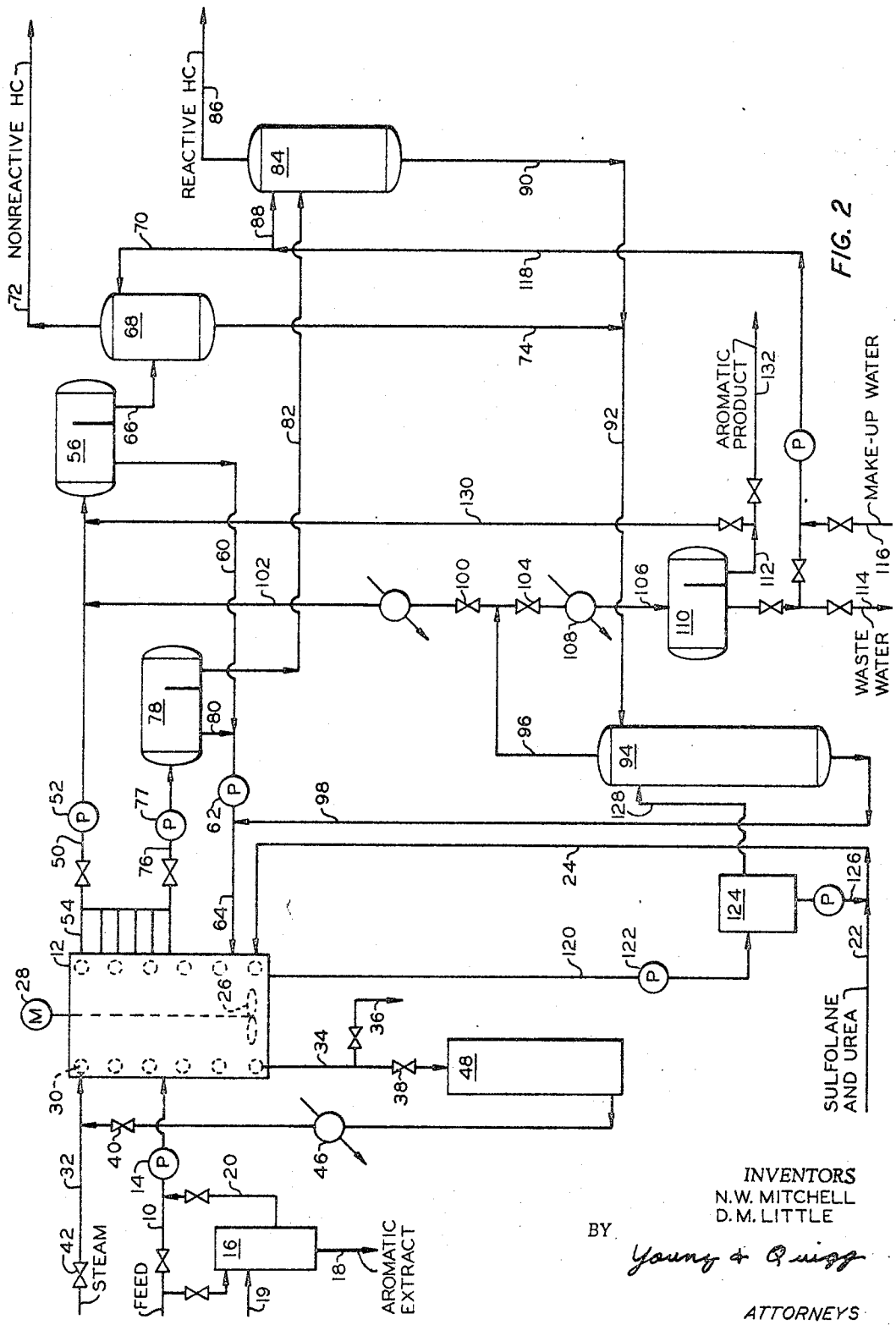
FIGURE 2 is a schematic representation of one embodiment of an apparatus suitable for carrying out the invention.

Referring now to FIGURE 2, feed containing normal and branched chain paraffins from line 10 is metered into reaction vessel or zone 12 by pump 14. This feed can contain in addition to normal and branched chain paraffins, normal and branched chain olefins, naphthenics (cycloparaffins) such as cyclohexane, and aromatics. Alternatively, feed from line 10 can be fed to aromatic removal colume 16 wherein aromatic extract is removed and recovered via line 18 and substantially aromatic-free feed is returned to line 10 via line 20, if desired. The solvent for aromatics is added to column 16 via line 19. Sulfolane plus urea is initially added to the reaction vessel via line 22 which connects with line 24. The sulfolane and urea can also be added via separate conduits. Since this is a batch operation, once the reactor is initially charged with sulfolane plus urea no additional sulfolane plus urea will be added to the system except that necessary to make up lost reactants. However, sulfolane and urea recovered during the various purification steps will be returned to the reaction vessel, for instance via line 24.

Agitation means such as stirrer 26 powered by motor 28 is provided to insure intimate mixing of the various reactants. This agitation means is not operated during the time when the reactants are allowed to stratify into separate phases and the upper phase is being removed. The reaction medium is of sufficiently low viscosity to allow quick separation without agitation, and, in fact, far better separation is effected without agitation.

Low pressure steam is introduced into heat exchange coils 30 via line 32 and condensate is removed via line 34 which connects with line 36. During this portion of the cycle, valves 38 and 40 are closed. During the cooling portions of the cycle, valve 42 is closed, valves 38 and 40 are opened, and water circulated through heat exchange coils 30 by means of a water pump (not shown) which pumps water through cooler 46 and thence through coils 30 and back to water drum 48.

Any conventional heating and cooling means can be utilized, for instance electrical resistance heaters can be used, although the use of a single set of cooling coils as illustrated is highly preferred since it simplifies the construction. This simplified construction is made possible by the fact that a single vessel can be used on both the formation and decomposition of the adduct. The operation of the heating or cooling means is controlled by means not shown so as to maintain the temperature at the desired level.

In each cycle after the reaction is complete, the agitation ceased, and the reactants have stratified into an unreactive upper layer and a lower layer of sulfolane containing adduct crystals and slurry, the nonreactive raffinate is withdrawn via line 50 by the action of pump 52. A plurality of withdrawal ports 54 are provided so as to make possible withdrawing substantially all of the nonreactive phase; each of these ports has a valve means (not shown) to allow the selective use of the port at the proper level. In place of this plurality of withdrawal ports it is apparent that a floating withdrawal tube or other means could be utilized within the reactor. The bulk of the nonreactive material to be withdrawn via line 50 will be withdrawn after the initial formation of the adduct. The amount available to be withdrawn on subsequent formations of the adduct and the amount to be withdrawn at the intermediate temperature where the occluded liquid is "sprung" is comparatively small.

This nonreactive hydrocarbon phase carried by line 50 is introduced into raffinate settler 56. The portion withdrawn at the intermediate temperature which represents occluded material which is "sprung" from the mixture to form the wash liquid could be handled separately, if desired, by means not shown, but generally will be carried by line 50 as indicated. Any entrained sulfolane settles out and is removed via line 60, and returned to the reaction vessel via line 64 through the action of pump 62. Separated hydrocarbon raffinate from settler 56 is introduced via line 66 to raffinate wash column 68. Water is introduced into raffinate water wash column 68 via line 70. The washed nonreactive hydrocarbon is recovered from raffinate wash column 68 via line 72. It is apparent that this water wash column is not essential and also that the raffinate settler could be replaced by other stripping means. Sulfolane-rich water from the raffinate water wash is removed via line 74.

At the end of the final cycle when the remaining sulfolane phase has been heated to a temperature to break the adduct for the final time, the released (reactive) hydrocarbon from the adduct forms an upper phase and the sulfolane phase containing, in solution, the amide also released by the decomposition of the adduct, forms a lower phase; this upper phase of released reactive hydrocarbon is then withdrawn via line 76 which connects with withdrawal ports 54. Again, it is apparent that instead of utilizing withdrawal ports 54 the upper phase would be siphoned off by means of a floating withdrawal tube or other means.

This reactive hydrocarbon, carried by line 76, is introduced through the action of pump 77 into reactive hydrocarbon settler 78. Reactive hydrocarbon settler 78 is similar to raffinate settler 56 in that it allows for the settling out of entrained sulfolane from the hydrocarbon. The sulfolane settling out in settler 78 is withdrawn via line 80 and introduced into line 60, through which it flows back to the reactor along with sulfolane from raffinate settler 56. The separated reactive hydrocarbon is withdrawn from reactive hydrocarbon settler 78 via line 82 and introduced into reactive hydrocarbon wash column 84. Reactive hydrocarbon product is recovered from column 84 via line 86. Wash water is introduced into column 84 via line 88, and the sulfolane rich wash water removed from column 84 via line 90. The sulfolane rich wash water from column 84 is combined with the sulfolane rich wash water from column 68 carried by line 74. These combined lines form line 92 which introduces this sulfolane rich water into sulfolane rerun column 94.

Sulfolane rerun column 94 serves a dual function. First, rerun column 94 can be operated at a temperature within the range of about 210 to 250° F. in which case the water will be taken off the top via conduit 96 and the sulfolane recovered as bottoms product via line 98. The sulfolane from sulfolane rerun column 94 carried by line 98 is returned to the reactor via line 64. When operating in this manner valve 100 in line 102 is closed and valve 104 in line 106 is open. Water carried by line 96 flows through line 106 and condenser 108 to settler 110. Any hydrocarbon carried over with this water is recovered via line 112. Waste water is eliminated from the system via line 114. Make-up water is added to the system via line 116, if desired. The water from line 116 or from settler 110 is introduced via line 118 into lines 88 and 70.

Alternatively, sulfolane rerun column 94 is operated at a temperature in the range of 175 to 525° F. This alternative arrangement is designed for use when it is desired to separate aromatics from the sulfolane in the reactor. Sulfolane is withdrawn from the reactor, preferably during or after the heating cycle when the area is in solution and no adduct crystals are present, through action of pump 122. This sulfolane is introduced into urea separator 124. The sulfolane plus urea is cooled prior to introduction into the urea separator 124 so as to precipitate the urea. The precipitated urea is then separated and then returned to the reactor via line 126. (Note this physical separation is of urea crystals and is not essential to the invention. Under no circumstances is any filtering, centrifuging or other physical separation of adduct crystals utilized.) Sulfolane is decanted from the top of tank 124 and introduced into sulfolane rerun column 94 via line 128. The aromatics dissolved in the sulfolane are recovered from rerun column 94 via line 96. At this point valve 104 can be closed, valve 100 open, and the aromatics carried via line 102 to line 50 and thence to raffinate (now aromatics) settler 56. In such case the water will be removed via line 60 and the aromatics will be recovered via nonreactive product line 72. In this embodiment the aromatics have not necessarily been separated from the nonreactive material; however, they have been separated from the reactive hydrocarbon product. If no effort is made to remove aromatic from the system, the sulfolane will become saturated with the aromatics and the aromatics will still be recovered with the nonreactive material. (Thus line 120, column 94 and associated equipment can be dispensed with.) Alternatively, however, valve 100 can be closed and valve 104 opened in which case the aromatics are carried via line 106 to settler 110 where they are separated from the water and delivered via line 112 either to line 130, which conveys them to line 50 and thence to recover as a part of the nonreactive product just as when valve 104 was closed and valve 100 was opened except that the water has been removed, or to line 132 where the aromatics are recovered as a product. The aromatics can be separately recovered via line 72 in the absence of raffinate or nonreactive product in this cyclic process. That is, aromatics can be introduced into settler 56 via line 130 during that part of the cycle where said settler has been emptied of nonreactive hydrocarbon.

In the case of extremely high boiling hydrocarbon materials the sulfolane can be taken off the top of column 94 and the hydrocarbon taken off the bottom.

As a matter of operating expediency, a plurality of identical separation systems can be utilized in parallel. Thus, for instance, if the total cycle time is eight hours and the time for filling the reaction vessel is 30 minutes, then 16 reaction vessels can be used in parallel so that one is being filled at any given time.

In the preferred embodiment, a mixed hydrocarbon feed is introduced into the reaction zone which already contains sulfolane and urea crystals, that is, the urea and sulfolane are added initially in the start-up of the reaction and thereafter simply remain in the reaction vessel. This mixture is agitated vigorously as the temperature is adjusted to the point where the adduct forms between the normal hydrocarbon and the urea. The agitation then ceases and the reactants stratify into an upper layer of branched chain hydrocarbon and a lower layer comprised essentially of a slurry of straight chain hydrocarbon-urea adduct crystals in a sulfolane compound containing minor amounts of occluded branched chain hydrocarbon. Because of the incompatibility of the hydrocarbons in the upper zone with the sulfolane compound, the upper layer is in the form of a separate phase. Any aromatics present will dissolve in the sulfolane until such time as the sulfolane is saturated with aromatics and thereafter the aromatics will form a portion of the hydrocarbon phase. On heating to the intermediate temperature a small amount of branched material which was occluded within the sulfolane phase and perhaps a very small amount of normal hydrocarbon, as a result of the decomposition of less stable adduct crystals, will enter the upper hydrocarbon phase. The cyclic process is then continued as set out hereinbefore. After the final cycle the reactants are allowed to stratify into an upper normal hydrocarbon phase and a lower sulfolane phase containing dissolved urea. The normal hydrocarbon is then removed by phase separation as a product of the process. Alternatively, the sulfolane can contain thiourea crystals, in which case the branched chain component of the feed is adducted.

While many standard parts such as temperature controllers, valves, pumps, control equipment, and the like have not been shown in FIGURE 2 for the sake of simplicity, their inclusion is understood by those skilled in the art and is within the scope of the invention.

Example

Referring to FIGURE 2, 100 barrels of kerosene (API gravity 45.0 and boiling range of 330 to 520° F.) are charged to a reaction vessel such as vessel 12 of FIGURE 2, to which have already been charged 54,000 pounds of sulfolane and 27,000 pounds of urea. The feed kerosene had, by volume, 8 percent aromatics and 30 percent normal paraffins. The temperature was controlled as shown in FIGURE 1, each of the steps taking the amount of time as indicated by FIGURE 1.

The total amount of raffinate from the first cycle including both the nonreactive phase formed after forming the adduct at 100° and the wash liquids "sprung" and removed at 125° is 52.6 barrels with a volume percent of non-normal paraffins of 96.2.

The total amount of raffinate of the second cycle including both the nonreactive phase removed after the formation of the adduct for a second time at 115° F. and the wash liquids "sprung" and removed at 135° F. is 7.1 barrels having a volume percent of non-normal paraffins of 91.5.

The total raffinate from the third cycle including the nonreactive phase formed after forming the adduct for the third time and the wash liquids "sprung" and removed at 145° F. is 3.9 barrels having a volume percent normal paraffins of 89.8.

About 8.0 barrels (primarily the aromatics) dissolves in the sulfolane.

Normal paraffin product in an amount of 28.4 barrels is recovered having a volume percent purity of normal paraffins of about 95 percent. This recovery of 28.4 barrels of normal paraffins represents a 90 percent yield of all the normal paraffins in the feed.

It is apparent from the above example that it is possible utilizing the instant invention to effect a separation of normal paraffins having exceptionally high purity without sacrificing the yield of the product and in a system which employs no elaborate separation steps such as filtering, centrifuging, or separation under agitation from a thixotropic mixture.

While this invention has been described in detail for the purpose of illustration, it is not to be construed as limited thereby but is intended to cover all changes and modifications within the spirit and scope thereof.

We claim:

1. A method for separating a mixture of hydrocarbon compounds, wherein at least one of said compounds contains from 6 to 50 carbon atoms per molecule and is reactive with an amide selected from the group consisting of urea and thiourea to form a solid adduct therewith, which comprises:
   (1) introducing said mixture, said amide, and a sulfolane compound into a reaction zone;
   (2) admixing the contents of said reaction zone at a temperature below the decomposition temperature of said adduct to form said adduct;
   (3) forming an upper unreactive hydrocarbon phase and a lower phase comprising a slurry of said adduct crystals in said sulfolane;
   (4) withdrawing said unreactive hydrocarbon as a product of the process from said reaction zone;
   (5) heating said slurry to an intermediate temperature at which no substantial decomposition of the adduct occurs to release occluded hydrocarbons, and thereafter withdrawing said thus released occluded hydrocarbons;
   (6) further heating said slurry to a temperature above the decomposition temperature of said adduct to decompose said adduct and release said reactive hydrocarbon and said amide;
   (7) cooling said reactive hydrocarbon and amide mixture and repeating steps (2), (3), (4), (5), and (6) at least once, steps (2) and (5) being carried out at progressively higher temperatures in each cycle; and
   (8) withdrawing said reactive hydrocarbon phase as a product of the process from said reaction zone.

2. A method according to claim 1 wherein said amide is urea and wherein said sulfolane compound is sulfolane.

3. A method according to claim 1 wherein said amide is urea, said reactive hydrocarbon is a straight chain hydrocarbon having from 10 to 13 carbon atoms per molecule, and said sulfolane compound is sulfolane.

4. A method according to claim 1 wherein said steps (2), (3), (4), (5), and (6) are repeated between one and five times.

5. A method according to claim 1 wherein: step (2) is carried out initially at a temperature within the range of 80 to 110° F., step (5) is carried out initially at a temperature within the range of 120 to 130° F., and step (6) is carried out initially at a temperature within the range of 160 to 185° F., and thereafter step (2) is carried out at a temperature within the range of 105 to 130° F., step (5) is carried out at a temperature within the range of 130 to 155° F., and step (6) is carried out at a temperature within the range of 160 to 185° F.

6. A method according to claim 5 wherein said amide is urea and said sulfolane compound is sulfolane.

7. A method according to claim 1 wherein: steps (2), (3), (4), (5), and (6) are repeated two times, step (2) being carried out initially at a temperature within the range of 80 to 110° F., step (5) being carried out initially at a temperature within the range of 120 to 130° F., and step (6) being carried out initially at a temperature within the range of 160 to 185° F., thereafter step (2) being repeated at a temperature within the range of 105 to 120° F., step (5) being repeated at a temperature within the range of 130 to 140° F., and step (6) being repeated at a temperature within the range of 160 to 185° F., and thereafter step (2) being repeated a second time at a temperature within the range of 120 to 130° F., step (5) being repeated a second time at a temperature within the range of 140 to 155° F., and step (6) being repeated a second time at a temperature within the range of 160 to 185° F.

8. A method according to claim 7 wherein: step (2) is carried out initially at a temperature of 100° F., step (5) is carried out initially at a temperature of 125° F., step (6) is carried out initially at a temperature within the range of 160 to 165° F., thereafter step (2) is repeated at a temperature of 115° F., step (5) is repeated at a temperature of 135° F., and step (6) is repeated at a temperature within the range of 160 to 165° F., and thereafter step (2) is repeated a second time at a temperature of 125° F., step (5) is repeated a second time at a temperature of 145° F., and step (6) is repeated a second time at a temperature within the range of 160 to 165° F.; wherein said amide is urea; and wherein said sulfolane compound is sulfolane.

References Cited

UNITED STATES PATENTS

| | | | |
|---|---|---|---|
| 2,520,715 | 8/1950 | Fetterly | 260—676 |
| 2,911,350 | 11/1959 | Kerns | 208—25 |
| 2,914,455 | 11/1959 | Keller | 208—25 |

HERBERT LEVINE, Primary Examiner

U.S. Cl. X.R.

208—25; 260—676